US012681338B2

(12) United States Patent
Nagase et al.

(10) Patent No.: US 12,681,338 B2
(45) Date of Patent: Jul. 14, 2026

(54) ELECTRO-OPTICAL DEVICE

(71) Applicant: TDK CORPORATION, Tokyo (JP)

(72) Inventors: Kenji Nagase, Hong Kong (CN);
Hiroshi Take, Hong Kong (CN);
Shingo Miyata, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 203 days.

(21) Appl. No.: 17/914,280

(22) PCT Filed: Mar. 31, 2021

(86) PCT No.: PCT/JP2021/013932
§ 371 (c)(1),
(2) Date: Sep. 23, 2022

(87) PCT Pub. No.: WO2021/201131
PCT Pub. Date: Oct. 7, 2021

(65) Prior Publication Data
US 2023/0115362 A1      Apr. 13, 2023

(30) Foreign Application Priority Data

Mar. 31, 2020    (CN) .......................... 202010241143.7

(51) Int. Cl.
G02F 1/035      (2006.01)
G02F 1/03       (2006.01)
G02F 1/21       (2006.01)

(52) U.S. Cl.
CPC ................ G02F 1/035 (2013.01); G02F 1/03 (2013.01); G02F 1/0305 (2013.01);
(Continued)

(58) Field of Classification Search
CPC .................................. G02F 1/035; G02F 1/212
See application file for complete search history.

(56) References Cited

U.S. PATENT DOCUMENTS 5,039,186 A  *  8/1991  Man ......................... G02B 6/13
                                                            359/332
7,088,875 B2     8/2006  Sugiyama et al.
                (Continued)

FOREIGN PATENT DOCUMENTS

JP       2006-195383 A      7/2006
JP       2007-328257 A      12/2007
                (Continued)

OTHER PUBLICATIONS

Iskander, George, "Stabilization of an electro-optic modulator for quantum communication using a low-cost microcontroller", Sep. 3, 2019, Caltech Undergraduate Research Journal (Year: 2019).*
                (Continued)

*Primary Examiner* — Thomas A Hollweg
*Assistant Examiner* — Kirsten D. Endresen
(74) *Attorney, Agent, or Firm* — Oliff PLC

(57)      ABSTRACT

An electro-optical device, including: a substrate; an optical waveguide composed of an electro-optic material film formed in a ridge shape on the substrate; a buffer layer configured to cover the optical waveguide; and an upper electrode provided on the optical waveguide through the buffer layer, and the buffer layer has a recess on the upper electrode side above the optical waveguide. Accordingly, the propagation loss of light can be suppressed.

10 Claims, 4 Drawing Sheets

(52) U.S. Cl.
      CPC ............ *G02F 1/0316* (2013.01); *G02F 1/212*
                      (2021.01); *G02F 2201/07* (2013.01)

(56)                        References Cited

U.S. PATENT DOCUMENTS

2002/0154843 A1 * 10/2002 Betts ..................... G02F 1/2255
                                                      385/2
2006/0051011 A1 * 3/2006 Ohmori ............... G02B 6/4214
                                                      385/39
2007/0297720 A1   12/2007 Sugiyama
2020/0218126 A1    7/2020 Watsuka et al.

FOREIGN PATENT DOCUMENTS

JP        4485218 B2     6/2010
JP        2014142411 A  * 8/2014
WO    WO-2019039215 A1 * 2/2019  ........... G02F 1/0316

OTHER PUBLICATIONS

Jul. 6, 2021 International Search Report issued in International
Patent Application No. PCT/JP2021/013932.
Jul. 6, 2021 Written Opinion of the International Searching Author-
ity issued in International Patent Application No. PCT/JP2021/
013932.

* cited by examiner

[Fig. 1a]
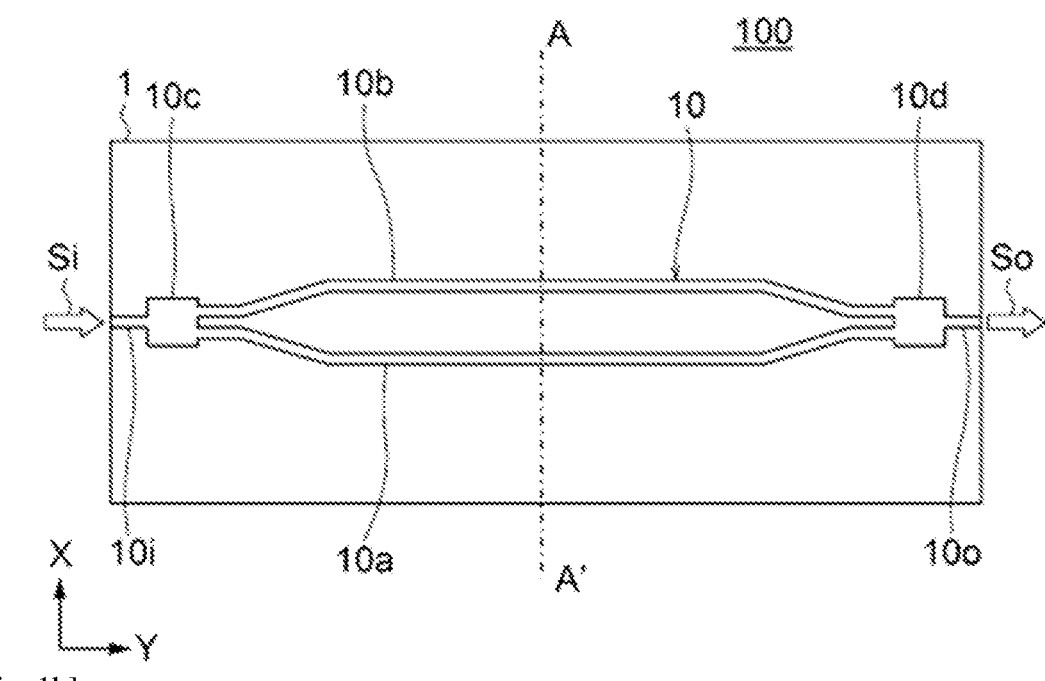
[Fig. 1b]
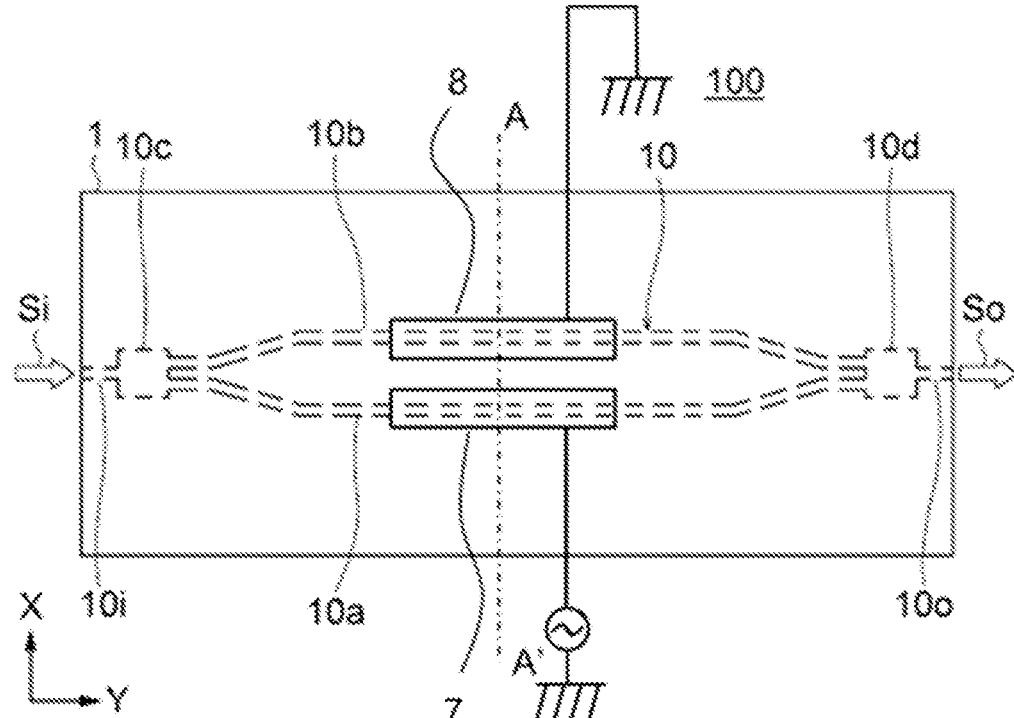

[Fig. 2]
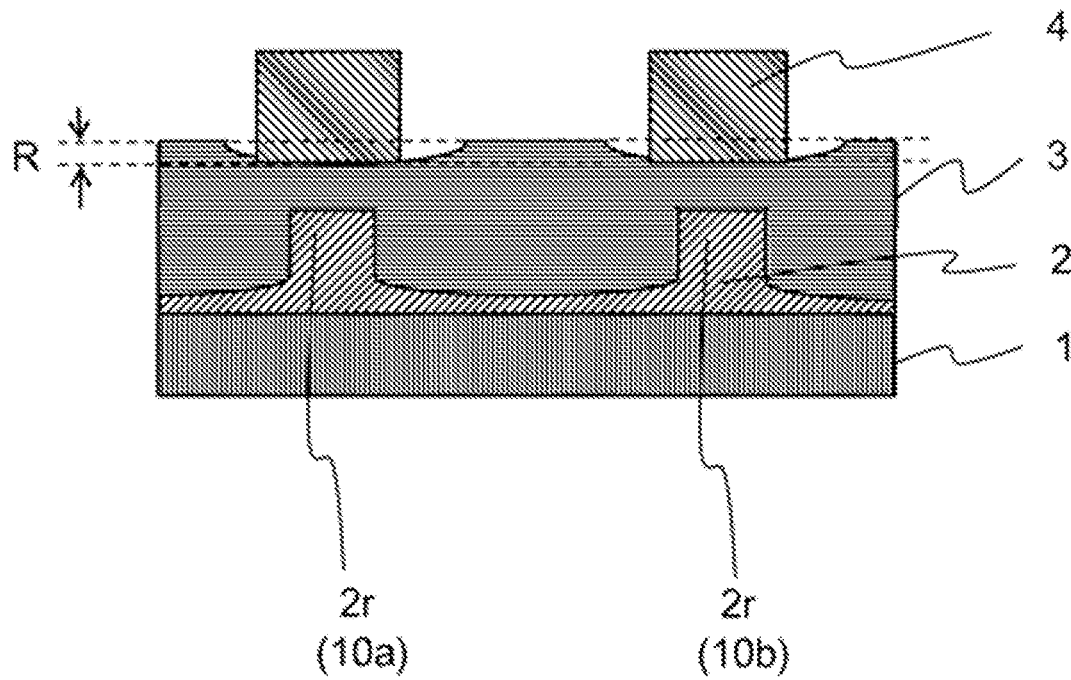
[Fig. 3]
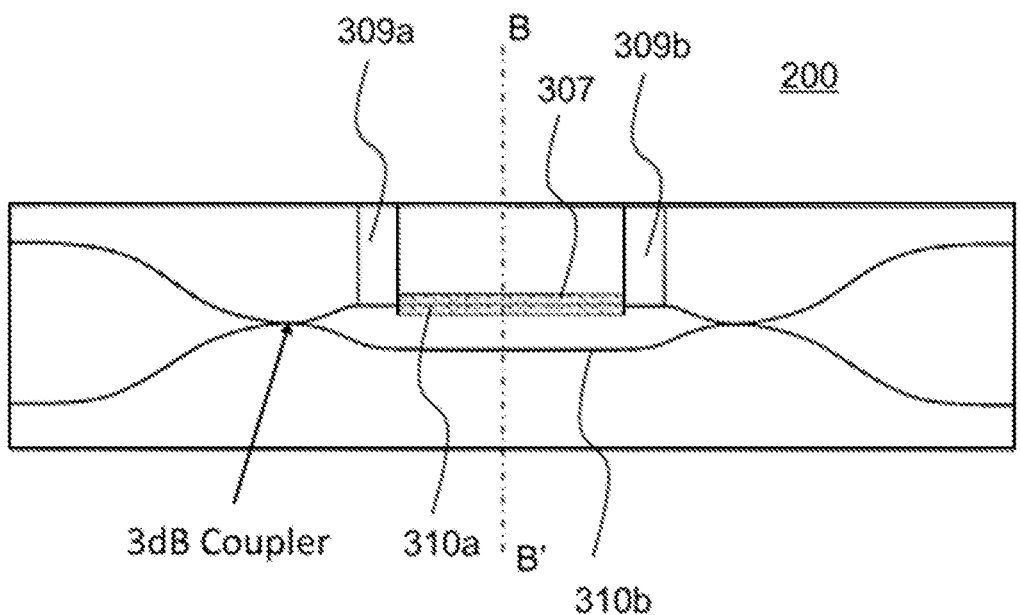

[Fig. 4]
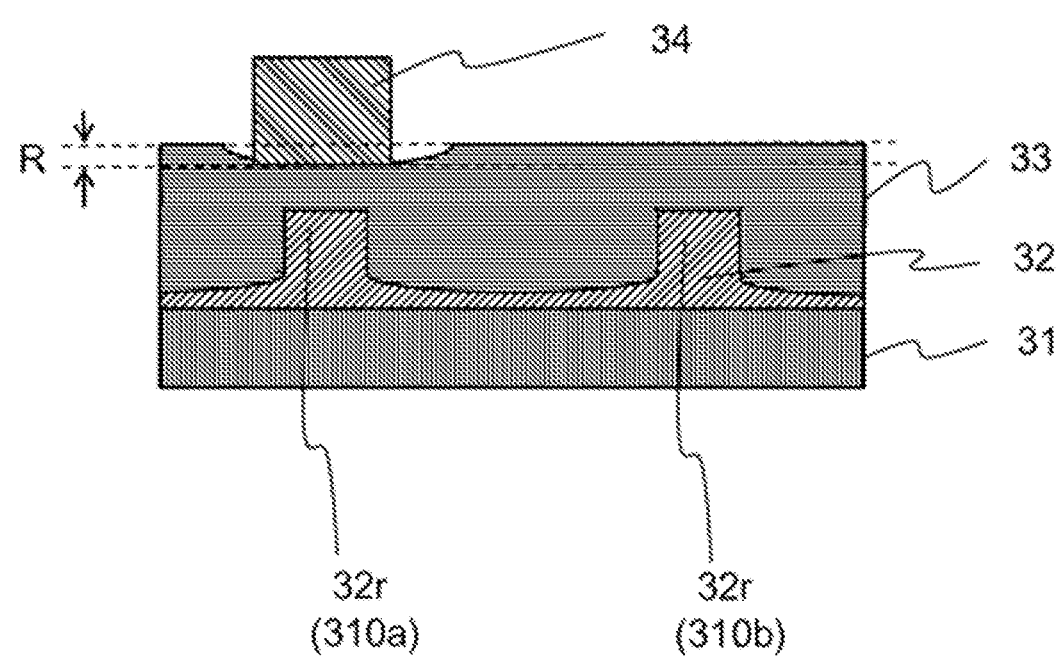
32r
(310a)
32r
(310b)
[Fig. 5]
300
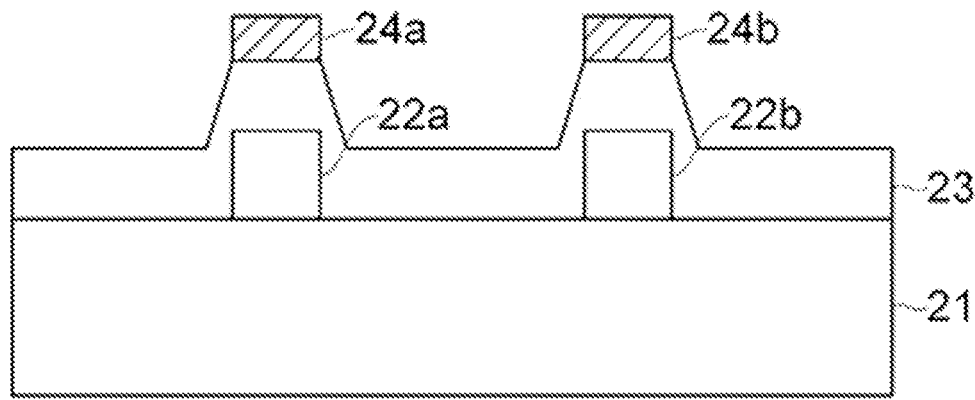

[Fig. 6]
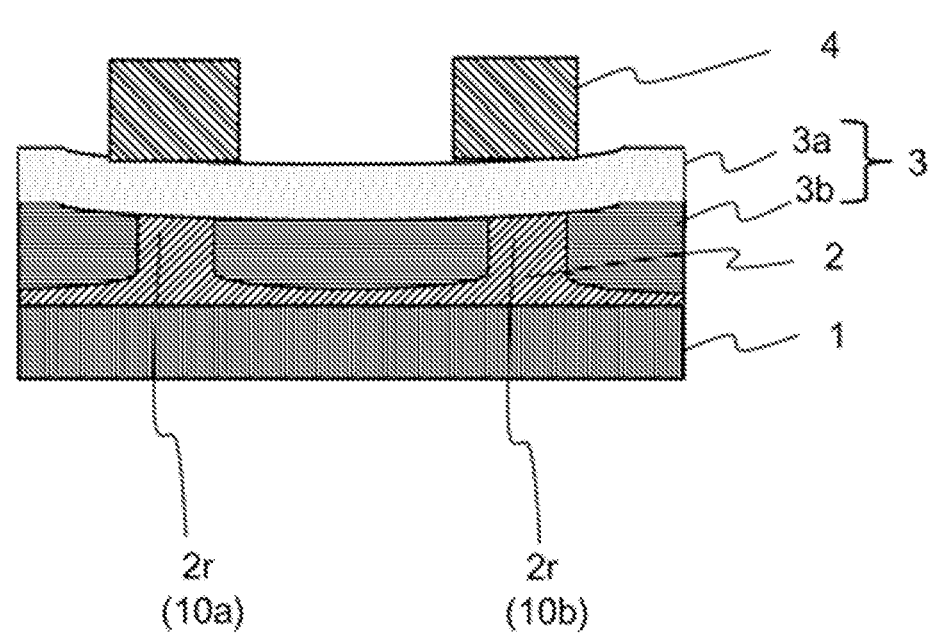

ELECTRO-OPTICAL DEVICE

TECHNICAL FIELD

The present invention relates to an electro-optical device used in the fields of optical communication and optical instrumentation.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

Optical fiber communication has such advantages and is applied to various products, and its representative can be, for example, optical switching devices or optical modulators. In particular, as a method for converting an electric signal into an optical signal, there are known a direct modulation system using a semiconductor laser and an external modulation method using an optical modulator. The direct modulation does not require the optical modulator and is thus low in cost, but has a limitation in terms of high-speed modulation and, thus, the external modulation method is used for high-speed and long-distance applications.

As the optical modulator, a Mach-Zehnder optical modulator in which an optical waveguide is formed by Ti (titanium) diffusion in the vicinity of the surface of a single-crystal lithium niobate substrate has been practically used (see, e.g., Patent Document 1). Although high-speed optical modulators having a modulation speed of 40 Gb/s or more are commercially available, they have a major drawback that the entire length thereof is as long as about 10 cm. The Mach-Zehnder optical modulator is an optical modulator that uses an optical waveguide (Mach-Zehnder optical waveguide) having a Mach-Zehnder interferometer structure. The Mach-Zehnder interferometer is a device that separates light emitted from one light source into two beams, makes the two beams pass through different paths, and then recombines the two beams to cause interference, and the Mach-Zehnder optical modulator applying the Mach-Zehnder interferometer is used for generating various modulated lights.

In contrast, Patent Document 2 discloses a Mach-Zehnder optical modulator using a lithium niobate film. The optical modulator using the lithium niobate film achieves significant reduction in size and driving voltage as compared with an optical modulator using the lithium niobate single-crystal substrate. FIG. 5 shows a cross-sectional structure of a conventional optical modulator 300 described in Patent Document 2. A pair of optical waveguides 22a and 22b of a lithium niobate film are formed on a sapphire substrate 21, and a signal electrode 24a and a ground electrode 24b are disposed above the optical waveguides 22a and 22b, respectively, through a buffer layer 23. The optical modulator 300 is a so-called single drive type having one signal electrode 24a, and the signal electrode 24a and ground electrode 24b have a sym-metrical structure, so that electric fields to be applied to the optical waveguides 22a and 22b are the same in magnitude and opposite in polarity. However, the cross-sectional shape of the optical waveguides 22a, 22b is rectangular, and the propagation loss of light is large.

Patent Document 3 discloses a portion where the optical waveguide needs to be bent in the case of the Mach-Zehnder optical modulator. In order to prevent the loss of the bent portion, it is necessary to further enhance the locked-in of light, and a technique of forming a ridge-shaped optical waveguide has been disclosed.

In order to reduce the light propagation loss by reducing the size of the optical modulator, it is necessary to reduce the absorption and reflection of light leaking from the optical waveguide in the ridge-shaped LN film optical waveguide and to effectively apply an electric field from the electrode on the layer to the optical waveguide.

CITATION LIST

Patent Literature

Patent Document

Patent Document 1: Japanese Patent No. 4485218
Patent Document 2: JP 2006-195383A
Patent Document 3: JP 2007-328257A

SUMMARY OF INVENTION

The present invention has been completed in view of the above-mentioned problems, and its object is to provide a electro-optical device, comprising: a substrate; an optical waveguide composed of an electro-optic material film formed in a ridge shape on the substrate; a buffer layer configured to cover the optical waveguide; and an upper electrode provided on the optical waveguide through the buffer layer, and the buffer layer has a recess on the upper electrode side above the optical waveguide.

In addition, another object of the present invention is to provide an electro-optical device with a small light propagation loss, comprising: a substrate; first and second optical waveguides adjacent to each other, composed of an electro-optic material film formed in a ridge shape on the substrate; a buffer layer configured to cover the first and second optical waveguides and to be buried between the first and second optical waveguides; and first and second electrodes arranged to be opposite to the first and second optical waveguides above the buffer layer, the buffer layer has recesses above the first and second optical waveguides.

In addition, another object of the present invention is to provide an electro-optical device, comprising: a substrate; first and second optical waveguides adjacent to each other, composed of an electro-optic material film formed in a ridge shape on the substrate; a buffer layer configured to cover the first and second optical waveguides and to be buried between the first and second optical waveguides; and first and second electrodes arranged to be opposite to the first and second optical waveguides above the buffer layer, the distance from the surface of the substrate to the uppermost part of the buffer layer on the optical waveguide is smaller than the distance from the surface of the substrate to the uppermost part of the buffer layer on the portion where the optical waveguide is not formed.

In addition, in the electro-optical device of the present invention, it is preferable that the buffer layer provided between the first and second optical waveguides and the first and second electrodes has a shape protruding downward at the first and second optical waveguides.

In addition, in the electro-optical device of the present invention, it is preferable that the buffer layer provided between the first and second optical waveguides and the first and second electrodes has a shape bent downward at the first and second optical waveguides.

In addition, in the electro-optical device of the present invention, it is preferable that the amount of recess of the buffer layer on the first and second optical waveguides is 500 Angstrom or more, more preferably 1000 Angstrom to 10000 Angstrom.

In addition, in the electro-optical device of the present invention, it is preferable that the first and second optical waveguides are Mach-Zehnder optical waveguides.

In addition, in the electro-optical device of the present invention, it is preferable that the substrate is a single crystal substrate, the electro-optic material film is a lithium niobate film.

Advantageous Effects of the Invention

According to the electro-optical device of the present invention, an electric field can be effectively applied to the optical waveguide, thereby locking light in the optical waveguide and suppressing the propagation loss of the light.

BRIEF DESCRIPTION OF DRAWINGS

FIGS. 1(a) and 1(b) are plan views of the optical modulator 100 according to the first embodiment of the present invention, in which FIG. 1(a) illustrates only an optical waveguide, and FIG. 1(b) illustrates the entire configuration of the optical modulator 100 including traveling-wave electrodes.

FIG. 2 is a schematic cross-sectional view of the optical modulator 100 taken along line A-A' of FIG. 1(b).

FIG. 3 is a plan view of an optical switching device 200 according to another embodiment of the present invention.

FIG. 4 is a schematic cross-sectional view of the optical switching device 200 taken along line B-B' of FIG. 3.

FIG. 5 is a cross-sectional structure of conventional optical modulator 300.

FIG. 6 is a cross-sectional structure of a modification of the optical modulator 100.

DESCRIPTION OF EMBODIMENTS

Preferred embodiments of the present invention will be described in detail with reference to the accompanying drawings.

FIGS. 1(a) and 1(b) are plan views of an optical modulator (electro-optical device) 100 according to the first embodiment of the present invention, FIG. 1(a) illustrates only the optical waveguide, and FIG. 1(b) shows the entire of the optical modulator 100 including traveling wave electrodes.

As illustrated in FIG. 1(a) and FIG. 1(b), the optical modulator 100 includes a Mach-Zehnder optical waveguide 10 formed on a substrate 1 and having first and second optical waveguides 10a, 10b provided in parallel to each other; a first electrode 7 provided along the first optical waveguide 10a; and a second electrode 8 provided along the second optical waveguide 10b.

The Mach-Zehnder optical waveguide 10 is, for example, an optical waveguide having a structure of a Mach-Zehnder interferometer. The Mach-Zehnder optical waveguide 10 has the first and second optical waveguides 10a, 10b which are branched from a single input optical waveguide 10i at a demultiplexing section 10c, and the first and second optical waveguides 10a, 10b are combined into a single output optical waveguide 10o at a multiplexing section 10d. An input light Si is demultiplexed by the demultiplexing section 10c and travels through the first and second optical waveguides 10a, 10b, respectively, and then multiplexed at the multiplexing section 10d, the multiplexed light is output from the output optical waveguide 10 as modulated light So.

The first electrode 7 covers the first optical waveguide 10a in a plan view, and the second electrode 8 also covers the second optical waveguide 10b in a plan view. That is, the first electrode 7 is formed on the first optical waveguide 10a via a buffer layer (to be described later), and the second electrode 8 is also formed on the second optical waveguide 10b via a buffer layer. The first electrode 7 is connected to, for example, an AC signal, and can be referred to as a signal electrode. The second electrode is grounded, for example, and may be referred to as a "ground" electrode.

The electric signal (modulated signal) is input to the first electrode 7. The first and second optical waveguides 10a and 10b are made of a material, such as lithium niobate having electro-optical effect, so that the refractive indices of the first and second optical waveguides 10a and 10b are changed with $+\Delta n$ and $-\Delta n$ by an electric field applied to the first and second optical waveguides 10a and 10b, with the result that a phase difference between the pair of optical waveguides changes. A signal light modulated by the change in the phase difference is output from the output optical waveguide 10o.

FIG. 2 is a schematic cross-sectional view of the optical modulator 100 taken along line A-A' of FIG. 1(b).

As illustrated in FIG. 2, the optical modulator 100 of the present embodiment has a multilayer structure including a substrate 1, a waveguide layer 2, a buffer layer 3, and an electrode layer 4 which are laminated in this order. The substrate 1 is, e.g., a sapphire substrate, and a waveguide layer 2 made of a lithium niobate film is formed on the surface of the substrate 1. The waveguide layer 2 has the first and second optical waveguides 10a, 10b composed of a ridge portion 2r. The width of the first and second optical waveguides 10a, 10b may be, e.g., 1 μm.

The buffer layer 3 is formed on at least the upper surface of the ridge portion 2r of the waveguide layer 2 so as to prevent light propagating through the first and second optical waveguides 10a, 10b from being absorbed by the first electrode 7 or the second electrode 8. Therefore, the buffer layer 3 only needs to function as an intermediate layer between the optical waveguide and the signal electrode, and the material of the buffer layer can be widely selected as long as it is a non-metal. For example, the buffer layer may use a ceramic layer made of insulating materials such as metal oxides, metal nitrides, and metal carbides. The material of the buffer layer may be a crystalline material or an amorphous material. The buffer layer 3 is preferably formed of a material having a lower refractive index than the waveguide layer 2, such as $Al_2O_3$, $SiO_2$, $LaAlO_3$, $LaYO_3$, $ZnO$, $HfO_2$, $MgO$, $Y_2O_3$, and the like. The thickness of the buffer layer formed on the optical waveguide may be about 0.2 μm to 1.2 μm. In the present embodiment, the buffer layer 3 not only covers the upper surfaces of the first and second optical waveguides 10a, 10b, but is also buried between the first and second optical waveguides 10a, 10b. That is, the buffer layer 3 is also formed in a region that does not overlap with the first and second optical waveguides 10a and 10b in a plan view. The buffer layer 3 covers the entire region of the upper surface of the waveguide layer 2 where the ridge portion 2r is not formed, and the side surface of the ridge portion 2r is also covered by the buffer layer 3.

The electrode layer 4 is provided with the first electrode 7 and second electrode 8. The first electrode 7 is provided overlapping the ridge portion 2r corresponding to the first optical waveguide 10a so as to modulate light traveling inside the first optical waveguide 10a and opposed to the first optical waveguide 10a through the buffer layer 3. The second electrode 8 is provided overlapping the ridge portion 2r corresponding to the second optical waveguide 10b so as to modulate light traveling inside the second optical waveguide 10b and opposed to the second optical waveguide 10b through the buffer layer 3.

Although the waveguide layer 2 is not particularly limited as long as it is an electro-optical material, it is preferably made of lithium niobite (LiNbO₃). This is because lithium niobate has a large electro-optical constant and is thus suitable as the constituent material of an optical device such as an optical modulator. Hereinafter, the configuration of the present invention when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The term "epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, the existence of an epitaxial film can be confirmed by first measuring the peak intensity at the orientation position by 2θ-θX-ray diffraction and then confirming poles.

Specifically, first, in the 2θ-θX-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since LiNbO₃ has a trigonal crystal system, single-crystal LiNbO₃ (014) has 3 poles. For the lithium niobate film, it is known that crystals rotated by 180° about the c-axis are epitaxially grown in a symmetrically-coupled twin crystal state. In this case, three poles are sym-metrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of LixNbAyOz. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

The lithium niobate film preferably has a thickness of equal to or smaller than 2 μm. This is because a high-quality lithium niobate film having a thickness larger than 2 μm is difficult to form. The lithium niobate film having an excessively small thickness cannot completely confine light, allowing light to leak to the substrate or the buffer layer and thus to be guided therethrough. Application of an electric field to the lithium niobate film may therefore cause a small change in the effective refractive index of the optical waveguides (10a and 10b). Thus, the lithium niobate film preferably has a thickness that is at least approximately one-tenth of the wavelength of light to be used.

It is desirable to form the lithium niobate film by a film forming method such as sputtering, CVD, or sol-gel process. If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth. For example, if the cladding layer (not shown) is made of Y₂O₃, a lithium niobate film of high quality can be formed.

As a formation method for the lithium niobate film, there is known a method of thinly polishing or slicing the lithium niobate single crystal substrate. This method is advantageous in that the same characteristics as the single crystal can be obtained and can be applied to the present invention.

In this embodiment, the buffer layer 3 has recesses above the first and second optical waveguides 10a and 10b. Specifically, the buffer layer 3 provided between the first and second optical waveguides 10a, 10b and the first and second electrodes 7, 8 has a shape protruding downward at the first and second optical waveguides 10a, 10b. That is, the buffer layer 3 provided between the first and second optical waveguides 10a, 10b and the first and second electrodes 7, 8 has a shape bent downward at the first and second optical waveguides 10a, 10b. The electrodes 7, 8 on the optical waveguides 10a, 10b can be closer to the optical waveguides 10a, 10b through such a buffer layer 3, and can effectively apply an electric field to the optical waveguide, thereby locking the light in the optical waveguide 10a, 10b and suppressing the propagation loss of the light.

As illustrated in FIG. 2, the amount of recess R of the buffer layer 3 on the first and second optical waveguides 10a, 10b is 500 Angstrom or more, preferably 1000 Angstrom to 10000 Angstrom, and more preferably 1000 Angstrom to 2000 Angstrom. Here, the amount of recess R is the distance from the uppermost end of the upper surface of the buffer layer 3 to the lowest end (lowest end of the depression) of the upper surface. In order to verify the relationship between the amount of recess R of the buffer layer 3 and the propagation loss of light, the inventor of the present invention conducted the following experiment. Specifically, samples 1 to 3 and comparative example are electro-optical devices with the same structure except for the difference in the amount of depression of the buffer layer on the ridge-shaped optical waveguide.

| | amount of recess of the buffer layer on the ridge-shaped optical waveguide | Light propagation loss |
|---|---|---|
| Sample 1 | 1000 Angstrom | 12 dB |
| Sample 2 | 2000 Angstrom | 12 dB |
| Sample 3 | 500 Angstrom | 14 dB |
| comparative example | 0 Angstrom | Poor light guide |

It can be seen from the table that when the amount of recess R is more than 1000 Angstrom, especially when 1000 Angstrom-2000 Angstrom, the light propagation loss is lower. Regarding the reduction of the propagation loss, although the cause has not been fully clarified, it can be presumed that the recess can make the electric field more effectively applied to the optical waveguide. In addition, the recess can prevent the light leaking upward from the optical waveguide from being reflected and then returning and interacting with each other. Therefore, it is possible to prevent the light leaking from the signal light from being scattered and reflected to cause adverse effects on the signal light. When the amount of recess R is 0 Angstrom, that is, no recess is formed, the propagation loss of light is relatively large. This may be due to the fact that the light leaking upward from the optical waveguide is reflected and then returned to interact with each other, and the light leaking from the signal light is scattered and reflected, which adversely affects the signal light. In addition, from the viewpoint of ease of manufacture, the amount of recess R is preferably 10000 Angstrom or less.

In addition, in the present embodiment, the distance from the surface (upper surface) of the substrate 1 to the uppermost portion of the buffer layer 3 on the optical waveguides 10a, 10b is smaller than the distance from the surface (upper surface) of the substrate 1 to the uppermost portion of the buffer layer 3 on the portion where the optical waveguide is not formed (i.e., between the optical waveguides 10a, 10b and the part other than the optical waveguides 10a, 10b). With this arrangement, the electrodes 7, 8 on the optical waveguides 10a, 10b can also be closer to the optical waveguides 10a, 10b, and an electric field can be effectively applied to the optical waveguides, thereby locking the light in the optical waveguide 10a, 10b and suppressing the propagation loss of the light.

FIG. 3 is a plan view of an optical switching device 200 according to another embodiment of the present invention. FIG. 4 is a schematic cross-sectional view of the optical switching device 200 taken along line B-B' of FIG. 3. The optical switching device 200 includes: first and second optical waveguides 310a, 310b formed on the substrate 1, a film heater (film electrode 34) 307 provided along the first optical waveguide 310a, and wirings 309a, 309b for energizing the film heater. The film heater (the film electrode 34) 307 is provided directly above the first optical waveguide 310a so as to overlap the first optical waveguide 310a in a plan view. As illustrated in FIG. 4, the optical switching device 200 according to the present embodiment has a multilayer structure including a substrate 31, a waveguide layer 32, a buffer layer 33, and a film electrode layer 34 which are laminated in this order. The substrate 31 is, e.g., a silicon substrate, and the waveguide layer 32 made of a lithium niobate film is formed on the surface of the substrate

8

31. The waveguide layer 32 has the first and second optical waveguides 10a and 10b each formed by a ridge portion 2r.

The optical switching device 200 uses the same ridge-shaped lithium niobate film as the optical modulator 100 of the first embodiment, and has a structure in which the optical waveguide is embedded in the buffer layer. There is no electrode layer 4 in the optical switching device 200, and a film heater (film electrode 34) 307 is used instead. That is, a film heater 307 is formed on the upper layer of a part of the optical waveguides 310a and 310b (the optical waveguide 310a in this embodiment), and the optical waveguide 310a can be heated by flowing a current through the film heater 307.

In the optical switching device 200, in the state where the film heater 307 is turned on, the phase of the light passing through the optical waveguide 310a is shifted, and the light is combined with another optical waveguide 310b to switch the light. In the optical switching device 200, by making the buffer layer 33 have recesses on the side of the film heater 307, the propagation loss of light can also be reduced, thereby obtaining the optical switching device 200 with excellent performance.

In addition, as the material used for the film heater, a heat-sensitive material such as MnNiCo-based oxide can be used, or a platinum heater can be used.

Although the present invention has been specifically described above in conjunction with the drawings and embodiments, it can be understood that the above description does not limit the present invention in any form. For example, in the above description of the optical modulator 100, the first electrode is used as a signal electrode and the second electrode is used as a ground electrode. However, it is not limited to this, and the first and second electrodes may be any electrodes that apply an electric field to the optical waveguide. Further, as shown in FIG. 6, the recesses of the buffer layer 3 above the adjacent first and second optical waveguides 10a and 10b can form as a whole. That is, one recess across the optical waveguides 10a and 10b can be formed. In addition, buffer layer 3 may consist of buffer layer 3a and buffer layer 3b, wherein the buffer layer 3b is formed in the same layer with the optical waveguides 10a and 10b, and the buffer layer 3a is formed on optical waveguides 10a and 10b and the buffer layer 3b. Both buffer layer 3a and the buffer layer 3b may have a recess across the optical waveguides 10a and 10b. Those skilled in the art can make modifications and changes to the present invention as needed without departing from the essential spirit and scope of the present invention, and these modifications and changes fall within the scope of the present invention.

REFERENCE SIGNS LIST 100 optical modulator
1 substrate
2 waveguide layer
2r ridge portion
3 buffer layer
4 electrode layer
7 first electrode
8 second electrode
10 Mach-Zehnder optical waveguide
10a first optical waveguide
10b second optical waveguide
10c demultiplexing section
10d multiplexing section
10i input optical waveguide
10o output optical waveguide 200 optical switching device
31 substrate
32 waveguide layer
32r ridge portion
33 buffer layer
34 film electrode layer
307 film heater
309a, 309b wirings
310a, 310b first and second optical waveguides

The invention claimed is:

1. An electro-optical device comprising:
a substrate;
an optical waveguide composed of an electro-optic material film formed in a ridge shape on the substrate;
a buffer layer configured to cover the optical waveguide; and
an upper electrode provided on the optical waveguide through the buffer layer,
wherein:
the buffer layer has a curved recess that is bent toward the optical waveguide, and the upper electrode is provided on the curved recess of the buffer layer,
a width of the upper electrode is smaller than a width of the curved recess of the buffer layer,
the buffer layer contacts an entire upper surface of a layer of the optical waveguide, and
an upper surface of the buffer layer outside the curved recess is entirely a flat surface.

2. The electro-optical device according to claim 1, wherein an amount of the curved recess of the buffer layer is 1000 Angstrom to 10000 Angstrom.

3. The electro-optical device according to claim 1, wherein an amount of the curved recess of the buffer layer is 1000 Angstrom to 2000 Angstrom.

4. The electro-optical device according to claim 1, wherein the curved recess covers the optical waveguide as a whole.

5. An electro-optical device comprising:
a substrate;
first and second optical waveguides adjacent to each other, composed of an electro-optic material film formed in a ridge shape on the substrate;
a buffer layer configured to cover the first and second optical waveguides and to be buried between the first and second optical waveguides; and
first and second electrodes arranged to be opposite to the first and second optical waveguides above the buffer layer,
wherein:
the buffer layer has one or more curved recesses that are bent toward the first and second optical waveguides, and the first and second electrodes are provided on the one or more curved recesses of the buffer layer,
a width of the first and second electrodes is smaller than a width of the one or more curved recesses, and
the buffer layer provided between the first and second optical waveguides comprises a first buffer layer and a second buffer layer, each of which has a respective curved recess bent toward the first and second optical waveguides and covering the first and second optical waveguides as a whole, above the first and second optical waveguides.

6. The electro-optical device according to claim 5, wherein the first and second optical waveguides are Mach-Zehnder optical waveguides.

7. The electro-optical device according to claim 5, wherein the substrate is a single crystal substrate, and the electro-optic material film is a lithium niobate film.

8. The electro-optical device according to claim 5, wherein an amount of each of the one or more curved recesses is 1000 Angstrom to 2000 Angstrom.

9. The electro-optical device according to claim 5, wherein
the buffer layer covers an entire upper surface of a layer of the first and second optical waveguides, and
the buffer layer has a flat upper surface, and the one or more curved recesses are formed from the flat upper surface toward the first and second optical waveguides.

10. An electro-optical device comprising:
a substrate;
first and second optical waveguides adjacent to each other, composed of an electro-optic material film formed in a ridge shape on the substrate;
a buffer layer configured to cover the first and second optical waveguides and to be buried between the first and second optical waveguides; and
first and second electrodes arranged to be opposite to the first and second optical waveguides above the buffer layer,
wherein:
the buffer layer has one curved recess that is bent toward the first and second optical waveguides, and the first and second electrodes are provided on the one curved recess of the buffer layer, and
the one curved recess provided in the buffer layer covers the first and second optical waveguides as a whole as well as a portion of the buffer layer between the first and second optical waveguides, with the first and second electrodes being provided on the one curved recess.

* * * * *